(12) United States Patent
Ishikawa et al.

(10) Patent No.: US 7,106,363 B2
(45) Date of Patent: Sep. 12, 2006

(54) LENS APPARATUS, CAMERA SYSTEM, AND CAMERA

(75) Inventors: Masanori Ishikawa, Tokyo (JP); Seiichi Kashiwaba, Tochigi (JP); Shigeki Sato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 10/154,006

(22) Filed: May 23, 2002

(65) Prior Publication Data
US 2002/0196347 A1  Dec. 26, 2002

(30) Foreign Application Priority Data
May 28, 2001  (JP)  ............... 2001/158020

(51) Int. Cl.
*H04N 5/228* (2006.01)
*G03B 17/00* (2006.01)

(52) U.S. Cl. ............... 348/208.11; 348/219.1; 396/54

(58) Field of Classification Search ........... 348/208.11, 348/219.1, 201.13, 208.8, 208.99; 396/54
See application file for complete search history.

(56) References Cited

U.S. PATENT DOCUMENTS

| | | | |
|---|---|---|---|
| 5,615,397 A * | 3/1997 | Shiomi et al. ............... 396/55 |
| 5,754,226 A * | 5/1998 | Yamada et al. ............. 348/219.1 |
| 5,761,546 A | 6/1998 | Imada et al. |
| 6,630,950 B1 * | 10/2003 | Ohkawara et al. ....... 348/208.12 |
| 2002/0097324 A1 * | 7/2002 | Onuki ....................... 348/208 |

FOREIGN PATENT DOCUMENTS

JP  9-43657  2/1997

* cited by examiner

*Primary Examiner*—Lin Ye
(74) *Attorney, Agent, or Firm*—Morgan & Finnegan LLP

(57) ABSTRACT

The following lens apparatus is disclosed.

That is, a lens apparatus, which forms an optical image by means of an image taking optical system, is detachably mountable to a camera comprising an image pickup device for photoelectric conversion of the optical image, comprising:
an optical element, included in the abovementioned image taking optical system and being movable at least in a direction perpendicular to the optical axis; and
a control circuit, which controls the driving of the optical element at an amplitude that is in accordance with information about the pixels of the image pickup device that has been acquired from the camera side.

The lens apparatus, which can perform optimal control of the optical element even in combination with various digital cameras that respectively differ in the specifications concerning the pixels of the image pickup device, can thus be realized.

33 Claims, 5 Drawing Sheets

LENS APPARATUS, CAMERA SYSTEM, AND CAMERA

BACKGROUND OF THE INVENTION

1. Field of the Invention

This invention relates to a lens apparatus, used in combination with a camera that uses an image pickup device, and a camera system that includes this camera and lens apparatus.

2. Description of the Related Art

Since priorly with cameras that use silver halide films and digital cameras that use image pickup devices, systems for correcting the image vibration occurred by a hand shake being applied to a camera have been researched and propositions concerning such systems have been made.

Here, a system for correcting the image vibration due to handshake shall be described briefly.

The hand shake of a camera during the taking of an image is normally a vibration of 1 Hz to 12 Hz, in terms of frequency, and basically in order to enable an image to be taken without image vibration occurring even when such a hand shake is occurring at the time of the taking of the image, the vibration of the camera due to the abovementioned hand shake is detected and an image vibration correction lens is displaced in accordance with a value detected thereby.

Thus in order to enable an image to be taken without causing image vibration even when hand shake occurs, it becomes necessary firstly to accurately detect the vibration of the camera and secondly to correct the change of the optical axis due to the vibration of the camera by displacing an image vibration correction lens.

The detection of this vibration (camera shake) can in principle be performed by equipping a camera with a vibration detection unit, which detects acceleration, velocity, etc., and a computing unit, which electrically or mechanically integrates the output signal of the vibration detection unit and outputs a displacement value.

Image vibration correction can thus be performed by displacing an image vibration correction optical system based on the detected information and controlling the image vibration correction optical unit so as to change the image taking optical axis.

Drive units for driving an image vibration correction optical system include one wherein a coil and a magnet are used, with one of either the coil or magnet being disposed on a fixed part, the other being disposed on an image vibration correction optical system, and the drive being carried out by passing a current through the coil.

In carrying out image vibration correction, vibration in the vertical direction (shall be referred to hereinafter as the "pitch direction") when the camera is set in the normal position and vibration in the perpendicular, horizontal direction (shall be referred to hereinafter as the "yaw direction") are detected respectively. Two sets of an abovementioned drive unit are thus disposed to enable image vibration correction in the two directions of yaw and pitch and arrangements are made to enable each of these two drive units to be controlled independently.

Also, methods of reducing the friction in an image vibration correction optical system or drive unit in order to improve the drive characteristics of the drive unit that drives the image vibration correction optical system for correction of image vibration are proposed in Japanese Laid-open Patent No. H09-43657 (U.S. Pat. No. 5,761,546), etc.

With this art, in order to resolve the drive error that results from the friction during driving of the image vibration correction optical system, a high frequency alternating signal of microscopic amplitude is overlaid on the output of the vibration detection unit and the drive for image vibration correction is performed while fluidizing the image vibration correction optical system.

However, with this art, with regard to the optimization of the high frequency microscopic vibration for reduction of friction, only an indication is given concerning the changing of the amplitude of the vibration according to the judgment of whether or not exposure is in progress or changing the amplitude according to the exposure time.

When in a case where an image pickup device is used, such as in a digital camera, the optimal amplitude of the abovementioned high frequency microscopic vibration will differ according to the pixel pitch of the image pickup device. That is, if a high frequency microscopic vibration that is too large in amplitude with respect to the pixel pitch is applied, a vibration will occur in the image that is taken thereby.

Thus with a lens-exchangeable digital camera system, it is difficult to set the same amplitude for the abovementioned high frequency microscopic vibration regardless of the respective pixel pitches of the image pickup devices of the various types of digital cameras onto which a lens apparatus is to be mounted.

Also with a prior-art digital camera, when an optical image of a high frequency no less than the pixel pitch is input, a false signal that does not correspond to the inherent optical image may be generated and lower the image quality as a Moire pattern. Thus in general, an optical low-pass filter is disposed between the image taking optical system and the image pickup device to cut high frequency components of the optical image.

However, the thickness of such an optical low-pass filter presents a large impediment in making a digital camera compact.

SUMMARY OF THE INVENTION

An object of this invention is to provide a lens apparatus, which can constantly perform optimal image vibration correction control even in combined use with cameras with image pickup devices of different pixel pitches, and a camera system that uses this lens apparatus.

Another object of this invention is to provide a lens apparatus, which, without being equipped with an optical low-pass filter, can cut the high frequency components of an optical image and prevent the lowering of the image quality, and a camera system that uses this lens apparatus.

In order to achieve the above object, this invention provides a lens apparatus with the following arrangement.

That is, this invention provides a lens apparatus which forms an optical image by means of an image taking optical system and is detachably mountable to a camera comprising an image pickup device for photoelectric conversion of the optical image, comprising:

an optical element, included in the image taking optical system and being movable at least in a direction perpendicular to the optical axis;
  a drive unit, which drives the optical element;
  a communication circuit, which communicates information with the camera; and
  a control circuit, which makes the drive unit drive the optical element in the direction perpendicular to the optical axis at an amplitude that is in accordance with information about the pixels of the image pickup device acquired from the camera side via the communication circuit.

In order to achieve the above object, this invention also provides a lens apparatus with the following arrangement.

That is, this invention provides a lens apparatus, which forms an optical image by means of an image taking optical system and is detachably mountable to a camera comprising an image pickup device for photoelectric conversion of the optical image, comprising:

an image vibration correction optical system, included in the image taking optical system and being movable for correction of image vibration occurred by shaking of the lens apparatus;

a vibration detection unit, which detects the shaking of the lens apparatus;

a drive unit, which drives the image vibration correction optical system;

a communication circuit, which communicates information with the camera; and a control circuit, which provides drive signals to the drive unit to make the drive unit drive the image vibration correction optical system.

In this arrangement, the abovementioned control circuit generates a predetermined signal that differs from vibration detection signals from the vibration detection unit, determines the amplitude of the predetermined signal based on information about the pixels of the image pickup device acquired from the camera side via the communication circuit, and provides to the drive unit drive signals, obtained by synthesizing the abovementioned predetermined signal and the vibration detection signals, to make the abovementioned drive unit drive the image vibration correction optical system.

In order to achieve the above object, this invention also provides a lens apparatus with the following arrangement.

That is, this invention provides a lens apparatus, which forms an optical image by means of an image taking optical system and is detachably mountable to a camera comprising an image pickup device for photoelectric conversion of the optical image, comprising:

an image vibration correction optical system, included in the image taking optical system and being movable for correction of image vibration occurred by shaking of the lens apparatus;

a vibration detection unit, which detects the shaking of the lens apparatus, a drive unit, which drives the image vibration correction optical system;

a communication circuit, which communicates information with the camera; and a control circuit, which provides drive signals to the drive unit to make the drive unit drive the image vibration correction optical system.

In this arrangement, the control circuit generates a predetermined signal that differs from vibration detection signals from the vibration detection unit, determines the amplitude of the predetermined signal based on information concerning the pixels of the image pickup device acquired from the camera side via the communication circuit, and provides the predetermined signal as the drive signal to the drive unit to make the drive unit drive the image vibration correction optical system when image vibration correction is not performed.

In order to achieve the above object, this invention also provides a lens apparatus with the following arrangement.

That is, this invention provides a lens apparatus, which forms an optical image by means of an image taking optical system, comprising:

an image vibration correction optical system, included in the image taking optical system and being movable for correction of image vibration occurred by shaking of the lens apparatus;

drive unit, which drives the image vibration correction optical system; and a control circuit, which makes the driving unit drive the abovementioned image vibration correction optical system.

In this arrangement, the control circuit makes the drive unit drive the image vibration correction optical system so as to cut high frequency components of the optical image even when image vibration correction is not performed.

In order to achieve the above object, this invention also provides a camera system comprising: a camera, which is provided with an image pickup device for photoelectric conversion of the optical image; and a lens apparatus, which is detachably mountable to the camera and provided with an optical element, included in an image taking optical system for forming an optical image and being movable at least in a direction perpendicular to the optical axis, a drive unit, which drives the optical element, and a communication circuit, which communicates information with the camera; the camera system further comprising:

a camera side storage circuit, which is disposed in the camera and stores information about the pixels of the image pickup device; and a lens side control circuit, which is disposed in the lens apparatus, acquires, via the communication circuit, the information about the pixels of the image pickup device stored in the camera side storage circuit, and makes the drive unit drive the optical element in the direction perpendicular to the optical axis at an amplitude that is in accordance with the abovementioned information.

In order to achieve the above object, this invention also provides a camera system comprising: a camera, which is provided with an image pickup device for photoelectric conversion of the optical image; and a lens apparatus, which is detachably mountable to the camera and provided with an image vibration correction optical system, included in an image taking optical system for forming an optical image and being movable for correction of image vibration occurred by shaking of the lens apparatus, a vibration detection unit, which detects the shaking of the lens apparatus, and a drive unit, which drives the image vibration correction optical system; a camera system further comprising:

communication circuits, which are disposed respectively in the camera and the lens apparatus and communicate information between the camera and the lens apparatus;

a camera side storage circuit, which is disposed in the abovementioned camera and stores information about the pixels of the image pickup device; and a lens side control circuit, which is disposed in the lens apparatus, generates a predetermined signal that differs from vibration detection signals from the vibration detection unit, acquires, via the communication circuit, the information about the pixels of the image pickup device stored in the camera side storage circuit, determines the amplitude of the predetermined signal based on the abovementioned information, and provides to the drive unit drive signals, obtained by synthesizing the predetermined signal and the vibration detection signals, to make the drive unit drive the image vibration correction optical system.

In order to achieve the above object, this invention also provides a camera system comprising: a camera, which is provided with an image pickup device for photoelectric conversion of the optical image; and a lens apparatus, which is detachably mountable to the camera and provided with an image vibration correction optical system, included in an image taking optical system for forming an optical image and being movable for correction of image vibration occurred by shaking of the lens apparatus, a vibration detection unit, which detects the shaking of the lens apparatus, and a drive unit, which drives the image vibration correction optical system; a camera system further comprising:

communication circuits, which are disposed respectively in the camera and the lens apparatus and communicate information between the camera and the lens apparatus;

a camera side storage circuit, which is disposed in the camera and stores information about the pixels of the image pickup device; and a lens side control circuit, which is disposed in the lens apparatus, generates a predetermined signal that differs from vibration detection signals from the vibration detection unit, acquires, via the communication circuit, the information about the pixels of the image pickup device stored in the camera side storage circuit, determines the amplitude of the predetermined signal based on the information, and provides the predetermined signal as the drive signal to the drive unit to make the drive unit drive the image vibration correction optical system when image vibration correction is not performed.

In order to achieve the above object, this invention also provides a camera system comprising: a camera unit, which takes an optical image; and a lens unit, which forms the optical image by means of an image taking optical system and is provided with an image vibration correction optical system, included in the image taking optical system and being movable for correction of image vibration occurred by shaking of the lens unit, and a drive unit, which drives the image vibration correction optical system; a camera system further comprising:

a control circuit, which makes the drive unit drive the image vibration correction optical system so as to cut high frequency components of the optical image even when image vibration correction is not performed.

In order to achieve the above object, this invention also provides a camera, to which can be detachably mounted a lens apparatus, comprising an optical element, included in an image taking optical system for forming an optical image and being movable at least in a direction perpendicular to the optical axis, a drive unit that drives the optical element, and a control circuit that makes the drive unit drive the optical element in the direction perpendicular to the optical axis at an amplitude that is in accordance with information, concerning the pixels of the image pickup device, acquired from the camera side, a camera comprising an image pickup device, for photoelectric conversion of the optical image;

a communication circuit, which communicates information with the lens apparatus; and a storage circuit, which stores information about the pixels of the image pickup device.

In this arrangement, the communication circuit sends to the camera, information about the pixels of the image pickup device and is stored in the storage circuit.

In order to achieve the above object, this invention also provides a camera to which can be detachably mounted a lens apparatus, which forms an optical image by means of an image taking optical system, and comprises an image vibration correction optical system, included in the image taking optical system and being movable for correction of image vibration occurred by shaking of the lens apparatus, a vibration detection unit that detects the shaking of the lens apparatus, a drive unit that drives the image vibration correction optical system, and a control circuit that generates a predetermined signal that differs from vibration detection signals from the vibration detection unit, determines the amplitude of the predetermined signal based on information, about the pixels of an image pickup device, acquired from the camera side, and provides to the drive unit drive signals, obtained by synthesizing the predetermined signal and the vibration detection signals, to make the drive unit drive the image vibration correction optical system, a camera comprising:

an image pickup device, for photoelectric conversion of the optical image;

a communication circuit, which communicates information with the lens apparatus; and a storage circuit, which stores information about the pixels of the image pickup device.

In this arrangement, the information, which concerns the pixels of the image pickup device and is stored in the storage circuit, is sent to the camera via the communication circuit.

In order to achieve the above object, this invention also provides a camera to which can be detachably mounted a lens apparatus, which forms an optical image by means of an image taking optical system, and comprises an image vibration correction optical system, included in the image taking optical system and being movable for correction of image vibration occurred by shaking of the abovementioned lens apparatus, a vibration detection unit that detects the shaking of the lens apparatus, a drive unit that drives the image vibration correction optical system, and a control circuit that generates a predetermined signal that differs from vibration detection signals from the vibration detection unit, determines the amplitude of the predetermined signal based on information, concerning the pixels of an image pickup device, acquired from the camera side, and provides the predetermined signal as the drive signal to the drive unit to make the drive unit drive the image vibration correction optical system when image vibration correction is not performed, a camera comprising:

an image pickup device, for photoelectric conversion of the optical image;

a communication circuit, which communicates information with the lens apparatus; and a storage circuit, which stores information about the pixels of the abovementioned image pickup device.

In this arrangement, the information, which concerns the pixels of the image pickup device and is stored in the storage circuit, is sent to the camera via the communication circuit.

In order to achieve the above object, this invention also provides a camera to which can be detachably mounted a lens apparatus, which forms an optical image by means of an image taking optical system, and comprises an image vibration correction optical system, included in the image taking optical system and being movable for correction of image vibration occurred by shaking of the lens apparatus, a drive unit that drives the image vibration correction optical system, and a control circuit that makes the drive unit drive the image vibration correction optical system at an amplitude, determined based on information about the pixels of an image pickup device acquired from the camera side, to cut the high frequency components of the optical image even when image vibration correction is not performed, a camera comprising:

an image pickup device, for photoelectric conversion of the optical image;

a communication circuit, which communicates information with the lens apparatus; and a storage circuit, which stores information concerning the pixels of the image pickup device.

In this arrangement, the information, which about the pixels of the image pickup device and is stored in the storage circuit, is sent to the camera via the communication circuit.

Here, as the "image pickup device," a CCD or CMOS, etc., is used. The abovementioned information about the pixels may be information expressing at least one among the pixel pitch, the number of pixels, and the pixel size of the image pickup device.

Also, the "amplitude of the predetermined signal" may, for example, be of a magnitude by which the optical image on the image pickup surface of the image pickup device is displaced by an amount corresponding to a pixel pitch of the imaging pickup device.

As the image shake correction optical system, a type that is displaced in a direction perpendicular to the optical axis is preferable and besides such a system, a type that rotates about a point on the optical axis, etc., may also be used.

A drive unit, wherein a coil and a magnet are used, with one of either the coil or magnet being disposed on a fixed part, the other being disposed on the image vibration correction optical system, and the drive being carried out by passing a current through the coil, may be used and two sets of such a drive unit may be disposed to enable driving of the image vibration correction optical system in the two directions of pitch and yaw.

A camera system may be arranged by combining such a lens apparatus with a camera that stores information about the pixels of the camera's own image pickup device and can send the stored information to the lens apparatus.

A detailed configuration of the lens apparatus, camera system, and camera of the invention, the above and other objects and features of the invention will be apparent from the embodiments, described below.

DETAILED DESCRIPTION OF THE PREFERRED EMBODIMENT

Hereinafter, preferred embodiments of the invention will be described in detail with reference to the drawings.

Figure 1:
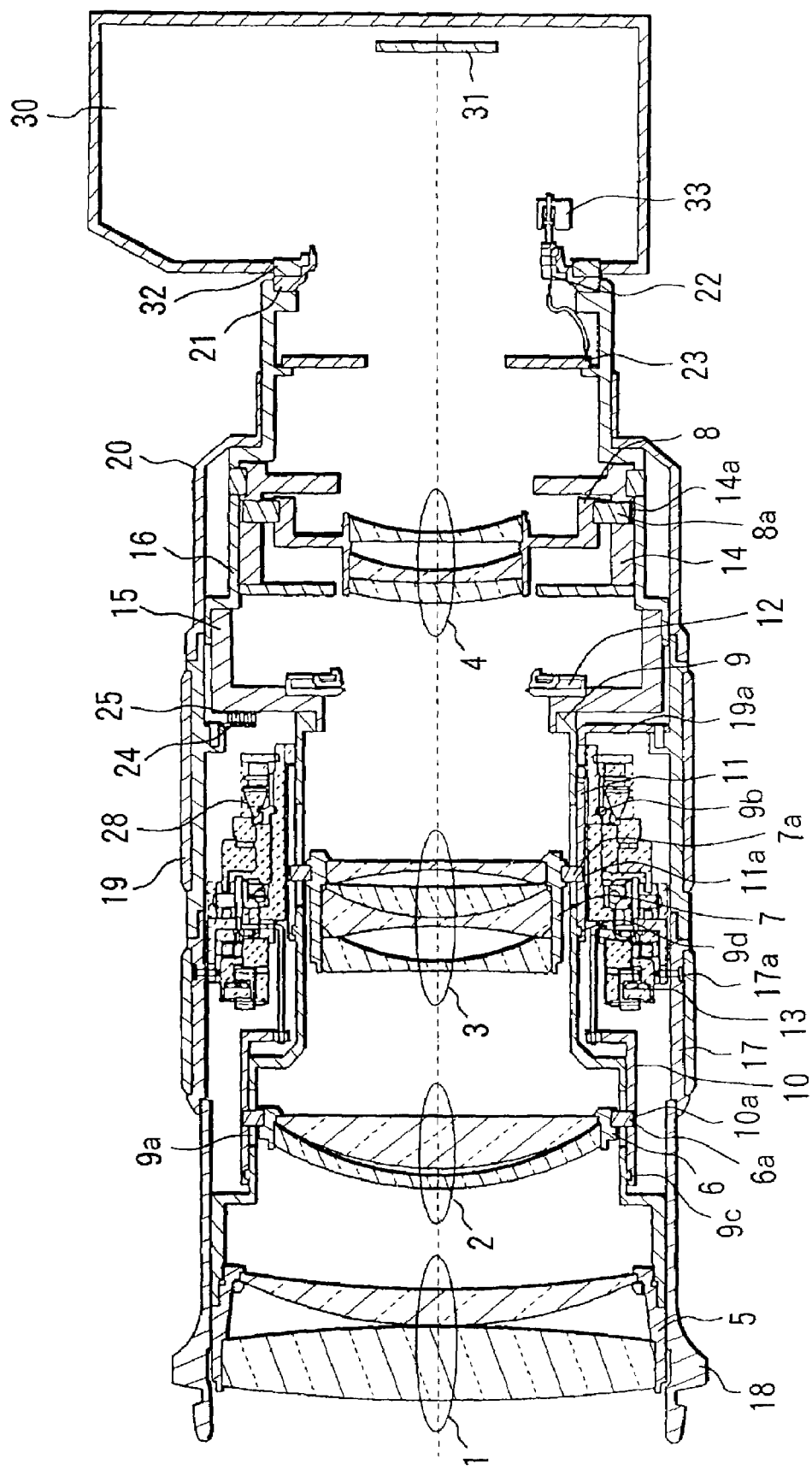
FIG. 1 is a sectional view, showing the arrangement of a lens-exchangeable digital camera system, which is an embodiment of this invention.

FIG. 1 is a sectional view of a lens-exchangeable digital camera system, which is an embodiment of this invention.

In this Figure, 20 denotes an exchangeable lens apparatus and 30 denotes a single-lens reflex type digital camera.

In the exchangeable lens apparatus 20, 1 denotes a first lens group, 2 denotes a second lens group, which serves as the focusing optical system, 3 denotes a third lens group, which serves as a variable power optical system, and 4 denotes a fourth lens group, which serves as an image vibration correction optical system. The image taking optical system is arranged from these first, second, third, and fourth lens groups and the light rays from a subject that passes through the image taking optical system is formed an optical image on an image pickup device 31 inside the camera 30.

5 denotes a first lens group lens barrel that holds the first lens group 1 and is mounted integrally to a guide barrel 9 to be described later. 6 denotes a focusing lens barrel, which holds the second lens group 2 and engages with a below-described guide barrel 9 and a focus cam barrel 10 to be driven in the optical axis direction. The focusing lens barrel 6 is provided with a supporting roller 6a for preventing the tilting of the focusing lens barrel 6 in the optical axis direction.

7 denotes a variable power lens barrel, which holds the third lens group 3 and engages with the guide barrel 9 and a variable power cam barrel 11 to be driven in the optical axis direction. The variable power lens barrel 7 is also provided with a supporting roller 7a for preventing the tilting of the variable power lens barrel 7 in the optical axis direction.

8 denotes an image vibration correction lens barrel, which holds the fourth lens group 4 and engages with a below-described fourth lens group holding frame 14. the image vibration correction lens barrel 8 is provided with supporting shafts 8a, which prevent the tilting of the image vibration correction lens barrel 8 in the optical axis direction and serve as guides in directions perpendicular to the optical axis.

9 denotes the abovementioned guide barrel and this guide barrel 9 is integrally mounted to a relay barrel 15 to be described below. Rectilinear groove parts 9a and 9b, which are parallel to the optical axis and engage with the above-described supporting rollers 6a and 7a, and protruding parts 9c and 9d, which prevent the movement in the optical axis direction of a below-described focus cam ring 10 and the variable power cam barrel 11, are formed at three locations on guide barrel 9.

10 denotes the abovementioned focusing cam ring, which is disposed on the outer circumference of the guide barrel 9 and is held so as to enable rotation while being prevented in movement in the optical axis direction by the protruding part 9c on the guide barrel 9. On the focus cam ring 10 are formed three cam groove parts 10a that engage with the above-described supporting roller 6a.

11 denotes the abovementioned variable power cam ring, which is disposed on the outer circumference of the guide barrel 9 and is held so as to enable rotation while being prevented in movement in the optical axis direction by the protruding part 9d on the guide barrel 9. On the variable power cam ring 11 are formed three cam groove parts 11a that engage with the above-described supporting roller 7a.

12 denotes an aperture stop unit, which is integrally mounted to a below-described relay barrel 15 and is driven by an unillustrated actuator.

13 denotes a focusing mechanism, which is integrally mounted to the guide barrel 9. The focusing mechanism 13 transmits the rotation of a below-described focusing operation ring 17 and the rotation of a vibration type motor 28 inside the mechanism 13 to the focus cam ring 11 via a key 13a.

14 denotes the abovementioned fourth lens group holding frame, which is integrally mounted to the fixed barrel 16, and on this fourth group holding frame 14 are formed guide groove parts 14a, with which the above-described supporting shafts 8a on the image vibration correction lens barrel 8 engages.

Since the guide groove parts 14a are formed as grooves that are long in the circumferential direction, they prevent image vibration correction lens barrel 8 from moving in the optical axis direction and tilting in the optical axis direction while allowing movement in the up/down and left/right directions with respect to the optical axis. The image vibration correction lens barrel 8 is thereby arranged to be movable in directions perpendicular to the optical axis.

Also, on the fourth lens group holding frame 14, parts for driving image vibration correction lens barrel 8 are mounted. The details of these parts shall be described later using FIG. 2.

15 denotes the abovementioned relay barrel 15 and this relay barrel 15 mainly serves the role of connecting the guide barrel 9 and the fixed barrel 16. On the fixed barrel 16, the relay barrel 15, the fourth lens group holding frame 14, and an electric circuit board 23 and a mount 21, which shall be described later, are mounted.

17 denotes the abovementioned focusing operation ring, which is sandwiched and held in a rotatable manner between a front outer ring 18 and a zoom operation ring 19, to be described below, and when the focusing operation ring 17 is rotated by a photographer, the rotation is transmitted to the abovementioned focusing mechanism 13 via pin 17a.

18 denotes the abovementioned front outer ring, which is integrally mounted to the first lens group lens barrel 5.

19 denotes the abovementioned zooming operation ring, which is sandwiched and held in a rotatable manner between the focusing operation ring 17 and a below-described rear outer ring 20, and when the zooming operation ring 19 is rotated by a photographer, the rotation is transmitted to the variable power cam ring 11 via a zoom key 19a.

20 denotes the abovementioned rear outer ring, which is integrally mounted to the fixed barrel 16.

the mount 21 engages with a mount 32 on the camera side to attach the lens apparatus 20 to the camera 30.

22 denote electrical contacts, which are mounted to the mount 21, contact electrical contacts 33 on the camera side to enable communication with the camera side, and form a circuit for power supply from the camera side to the lens side.

On the electrical circuit board 23, an electrical circuit that includes a microcomputer, etc is arranged. The electrical circuit on the electrical circuit board 23 performs communication with the camera side and receives the supply of power from the camera side via the electrical contacts 22. The electrical circuit board 23 is also connected via an unillustrated printed circuit board to the vibration type motor 28, the aperture stop actuator, and the image vibration correction actuator and can control these actuators by means of the electrical circuit on the electrical circuit board 23.

24 denotes a conductive zoom brush, which is integrally mounted to the zooming operation ring 19 and outputs an electrical signal in accordance with the position of contact with a conductive pattern on a zoom flexible circuit board 25 for detection of the focal length. The zoom flexible circuit board 25 is electrically connected to the above-described electrical circuit board 23 and transmits the detected focal length information to the microcomputer on the electrical circuit board 23.

On the digital camera 30, the lens apparatus 20 that is arranged from the parts to which the above-described symbols 1 through 28 have been provided is mounted.

31 denotes the abovementioned image pickup device, which performs photoelectric conversion of a subject image (optical image) formed by light rays that have passed through the image taking optical system of the lens apparatus 20. A CCD or CMOS, etc., is used as the image pickup device 31. 32 denotes the abovementioned camera side mount, which engages with the mount 21 of the lens side. 33 denotes the abovementioned electrical contacts, which contact the electrical contacts 22 of the lens side to enable communication with the lens side and supply power to the lens side.

Figure 2:
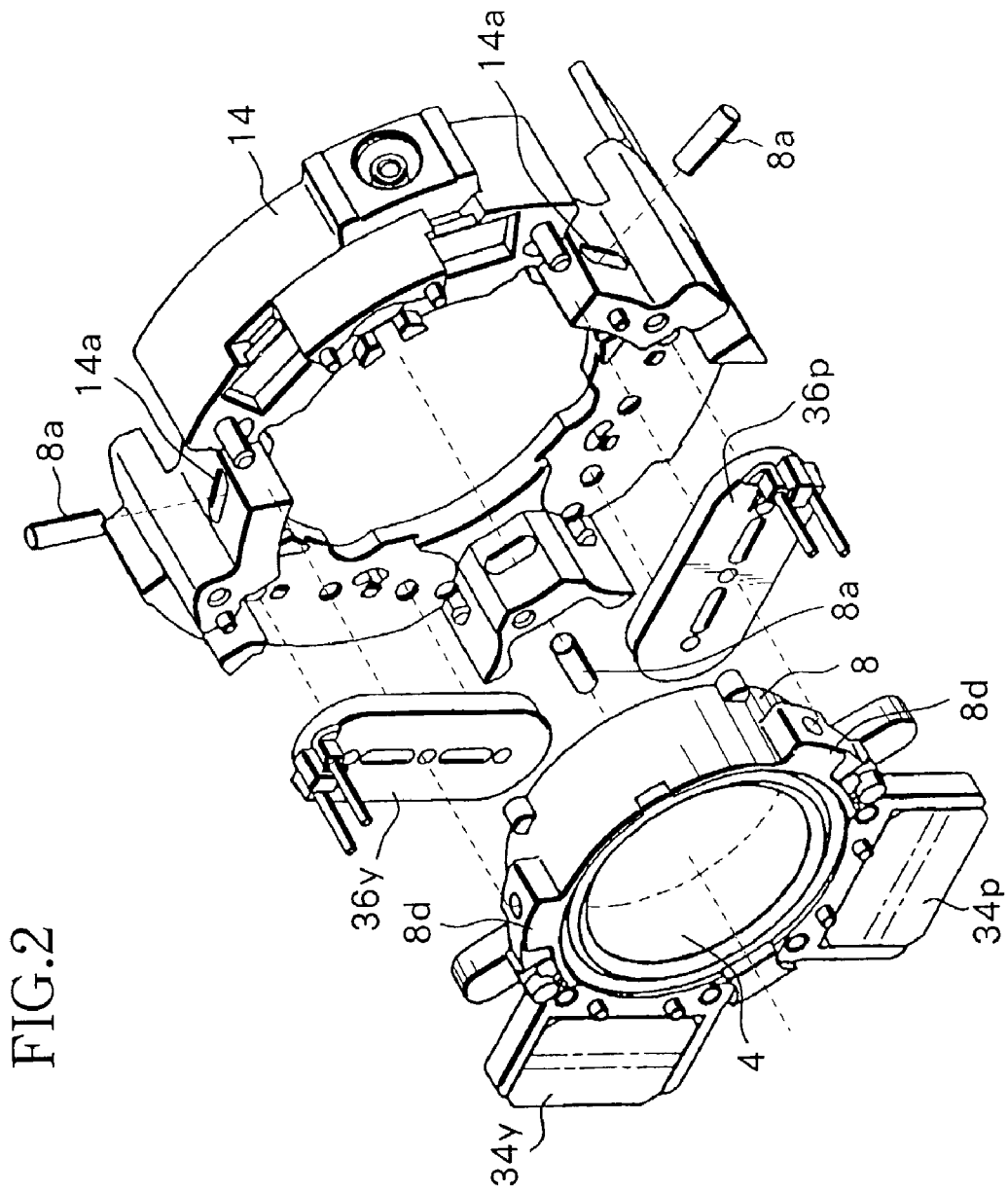
FIG. 2 is a perspective view, showing the arrangement of an image vibration correction optical unit provided inside the exchangeable lens of FIG. 1.

FIG. 2 is a perspective view, showing, in exploded form, the arrangement of the principal parts of the image vibration correction optical unit provided inside the exchangeable lens apparatus 20 of FIG. 1, and the arrangement of this image vibration correction optical unit shall now be described using FIG. 2.

In this Figure, 8 denotes the image vibration correction lens barrel, which supports the image vibration correction optical system (fourth lens group) 4, and permanent magnets 34p and 34y are fixed by adhesion, etc., onto this image vibration correction lens barrel 8.

14 denotes the fourth lens group holding frame. On surface parts of this fourth lens group holding frame 14 that oppose the permanent magnets 34p and 34y on the image vibration correction lens barrel 8, coils 36p and 36y are mounted.

As shown in FIG. 2, arm parts 8d, which extend radially in three directions, are provided on the image vibration correction lens barrel 8. The supporting shafts 8a are fixed by screwing onto these arm parts 8d and these supporting shafts 8a are inserted, as shall be described later, in the guide groove parts 14a of the fourth lens group holding frame 14 in a manner such that substantially no gaps will be formed in the optical axis direction.

Meanwhile, since the guide groove parts 14a are formed as slots that extend in the circumferential direction, the respective supporting shafts 8a can move in the circumferential direction inside the guide groove parts 14a.

The image vibration correction lens barrel 8 is thus made freely movable in all directions within the plane that contains the fourth lens group holding frame 14 (a plane that is perpendicular to the optical axis) and is fixed in position only in the optical axis direction.

However, since the supporting shafts 8a are inserted in the guide groove parts 14a in a manner such that substantially no gaps will be formed in the optical axis direction, friction tends to arise readily between these sections and the friction may prevent smooth startup in the image vibration correction startup process (in the process of starting the movement of the image vibration correction lens barrel 8 within the plane perpendicular to the optical axis) and be a cause of instability of the startup of image vibration correction.

With the present embodiment, a high frequency signal is overlaid onto a vibration detection signal that is in accordance with a camera shake to provide drive signals for the image vibration correction lens barrel 8. This point shall be described later.

In order to correct the image vibration, due to shaking of lens apparatus 20 (and camera 30), by means of the above-described image vibration correction optical unit, the lens apparatus 20 is provided with a vibration detection circuit, comprising a below-described angular velocity sensor, etc., and a position detection system, comprising a photoreflector, etc.

The vibration detection circuit and the position detection circuit shall now be described using FIGS. 2 and 3.

The vibration detection circuit 304 detects the respective vibrations occurred by hand shake, etc., in the pitch and yaw directions of the lens apparatus 20. A lens CPU 301 (a correction drive control circuit 301a to be described below) computes a target position for the image vibration correction lens barrel 8 in accordance with the output from the vibration detection circuit 304 and supplies electricity to the coils 36p and 36y, respectively. Thrust power due to magnet force is thus made to operate on permanent magnets 34p and 34y and the image vibration correction lens barrel 8, which is integral to these permanent magnets 34p and 34y, is thereby driven within a plane perpendicular to the optical axis.

The position detection system 307b detects the position of the image vibration correction lens barrel 8. The correction drive control circuit 301a supplies electricity to the coils 36p and 36y until it has been detected by the position detection system 307b that the image vibration correction lens barrel 8 has reached the targeted position. The image vibration correction is performed thereby.

Figure 3:
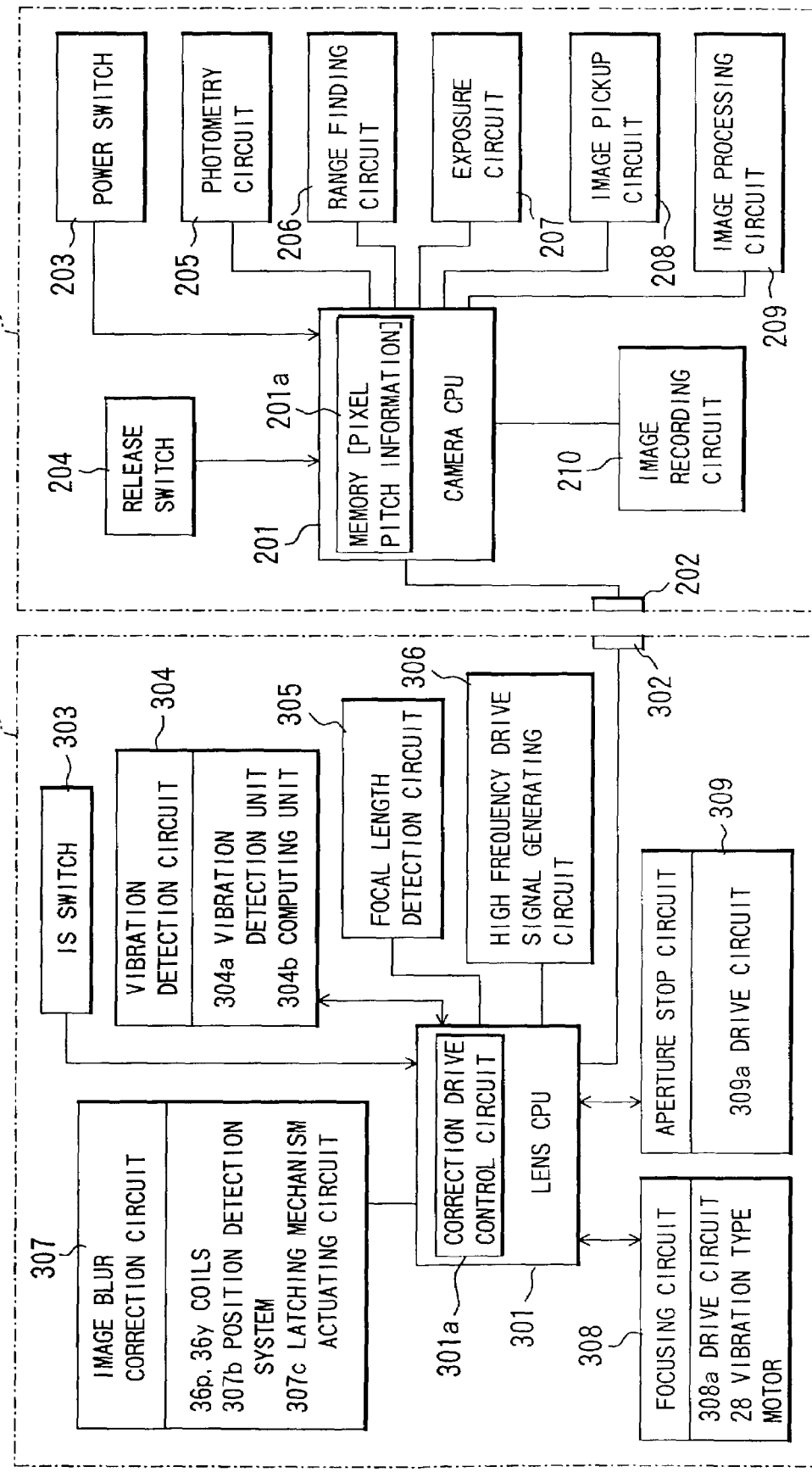
FIG. 3 is a block diagram, showing the electrical arrangement of the digital camera system of FIG. 1.

FIG. 3 is a block diagram, showing the electrical arrangement of the above-described lens-exchangeable digital camera system.

In this Figure, 200 denotes an electrical circuit inside the digital camera 30 and 300 denotes an electrical circuit inside the lens apparatus 20. A description shall now be given using FIGS. 1, 2, and 3.

First, the arrangement of the electrical circuit 200 of the camera side shall be described. 201 denotes a camera CPU, which comprises a microcomputer and a memory 201a and, as shall be described later, controls the operations of the various circuits inside the camera 30 and, when the lens apparatus 20 is mounted to the camera 30, performs the sending and receiving of information with the lens CPU 301 via the camera side electrical contacts 202 and the lens side electrical contacts 302.

The information that is sent to the lens apparatus side from memory 201a inside the camera CPU 201 is the pixel pitch information, that is, the information about the pixels of the image pickup device 31 that is stored in advance in the memory 201a.

In place of the pixel pitch information, pixel number information or pixel size information may be stored in advance in memory 201a inside the camera CPU 201 as the information about the pixels of the image pickup device 31.

Here, the pixel pitch information serves as the basis for determining the amplitude of a high frequency signal (predetermined signal) to be synthesized with (overlaid onto) the vibration detection signal at lens apparatus 20, and in the case where the information on the number of pixels of the image pickup device 31 is to be used as the information about the pixels of image pickup device 31, the pixel pitch can be determined by acquiring information about the size of the image pickup surface of the image pickup device 31 as well from the camera side to thereby determine the amplitude of the high frequency signal. Also, since the pixel size is in many cases the same as the pixel pitch, the amplitude of the high frequency signal may be determined based on the pixel size information instead of the pixel pitch information.

Also, though the case where a memory 201a is built into camera CPU 201 is described with the present embodiment, the memory may be provided at the exterior of camera CPU 201. A ROM or non-volatile EEPROM, etc., is suitable as the memory.

The camera side electrical contacts 202 (corresponding to 32 in FIG. 1) include a signal transmission contact for transmission of signals to the lens apparatus side and a power supply contact for supplying power to the lens apparatus side.

203 denotes a power switch that can be operated from the exterior and is a switch for starting up the camera CPU 201, supplying power to the various actuators, sensors, etc., inside the system, and enabling operation of the system.

204 denotes a two-stroke type release switch that can be operated from the exterior and the signal thereof is input into the camera CPU 201. The camera CPU 201 operates in accordance with the signal input from the release switch 204 and enters the image taking ready state when the first stroke switch (SW1) is ON.

In the image taking ready state, the exposure amount is determined by a photometry circuit 205 and a range finding circuit 206 ranges a subject that exists within the ranging area and determines the movement amount of the second lens group (referred to hereinafter as the "focusing lens") that is necessary for putting the image taking optical system of lens apparatus 20 in the focused state.

The information on the movement amount of the focusing lens 2 that is thus determined is sent to the lens CPU 301 to be described later.

Based on the received information on the movement amount of the focusing lens 2, the lens CPU 301 sends a drive signal to the focusing circuit 308 and the focusing circuit 308 acts to make the focusing operation of the focusing lens 2 be performed.

Next when the turning ON of the second stroke switch (SW2) of the release switch 204 is detected, the camera CPU 201 sends an aperture stop operation instruction to the lens CPU 301 and sends an exposure starting instruction to the exposure circuit 207.

The image pickup circuit 208, which includes the image pickup device 31 shown in FIG. 1, then performs photoelectric conversion of the subject image that has formed on the image pickup device 31 upon passage through the image taking optical system and outputs an image signal.

The image processing circuit 209 digitizes and compresses the image signal output from the image pickup circuit 208 and records and saves the image signal in a recording medium, such as a flash memory or other semiconductor memory, magnetic disk, optical disk, etc., by means of an image recording circuit 210.

The arrangement of the electric circuit of the lens side shall now be described. 302 denote the lens side electrical contacts (corresponding to 21 in FIG. 1), which include a signal transmission contact to which signals are transmitted from the camera side and a power supply contact to which power from the camera side is supplied.

303 denotes an IS switch that can be operated from the exterior to enable selection between performing and not performing the image vibration correction operation (the image vibration correction operation is performed when this switch is ON).

304 denotes the abovementioned vibration detection circuit, comprising a vibration detection unit 304a, which, in accordance with instructions from the lens CPU 301, detects the acceleration or velocity, etc., of the vertical shaking (pitch direction) and horizontal shaking (yaw direction) of the lens apparatus 20, and a computing unit 304b, which outputs the displacement value obtained by electrical or mechanical integration of the signal output from the vibration detection unit 304a to the lens CPU 301.

305 denotes a focal length detection circuit, which comprises the zoom brush 24, the zoom flexible circuit board 25, etc., shown in FIG. 1 and transmits the detected focal length information to the lens CPU 301.

306 denotes a high frequency drive signal generating circuit, which generates the signal (predetermined signal) for driving the image vibration correction optical system 4, shown in FIG. 1, in the pitch and yaw directions at a high frequency and a predetermined amplitude.

The amplitude of the predetermined signal is determined by the lens CPU 301 based on the pixel pitch information (or pixel number information or pixel size information) of the image pickup device 31 that was transmitted from the camera 20 via lens side electrical contacts 302 and the focal length information from the focal length detection circuit 305.

To be more specific, this amplitude is set to a magnitude by which the subject image is displaced by an amount corresponding to a pixel pitch on the image pickup surface of the image pickup device 31.

307 denotes an image vibration correction circuit. This image vibration correction circuit 307 has a pitch direction drive system (not shown in FIG. 3), which comprises the coil 36p provided in correspondence to the permanent magnet 34p shown in FIG. 2 and drives the image vibration correction optical system 4 in the pitch direction, a yaw direction drive system (not shown in FIG. 3), which comprises the coil 36y provided in correspondence to the permanent magnet 34y and drives the image vibration correction optical system 4 in the yaw direction, the above-described position detection system 307b, which detects the position of the image vibration correction optical system 4, and a latching mechanism actuating circuit 307c for actuating an image vibration optical system latching mechanism (not shown) for holding the image vibration correction optical system 4 at the position of the center of the optical axis of the image taking optical system when the image vibration correction drive is stopped.

308 denotes the abovementioned focusing circuit, having the vibration type motor 28 shown in FIG. 1 and a drive circuit 308a, which drives the motor 28 upon receiving the drive signal generated by the lens CPU 301 in accordance with the movement amount information for the focusing lens 2 that has been sent from the camera CPU 201.

309 denotes an aperture stop circuit and comprises an aperture stop actuator (not shown), which drives the diaphragm blades (not shown) of the aperture stop unit 12, and a drive circuit 309a, which is controlled to drive the aperture stop actuator by the lens CPU 301 that has received an aperture stop operation instruction sent from the camera CPU 201.

With the above arrangement, when the image vibration correction operation has been selected by IS switch 303, the lens CPU 301 sets the amplitude of the abovementioned predetermined signal, which is the high frequency signal to be generated by high frequency drive signal generating circuit 306 based on the pixel pitch information (or pixel number information or pixel size information) sent from the camera side (the memory 201a). The correction drive control circuit 301a inside the lens CPU 301 synthesizes the abovementioned predetermined signal and the vibration detection signal from the vibration detection circuit 304 to generate drive signals and applies the drive signals to the coils 36p and 36y inside the image vibration correction circuit 307.

By thus performing drive control of the image vibration correction optical system 4 using drive signals in which are overlaid the high frequency signal, the image vibration correction drive of good drive characteristics such that the friction during the driving of the image vibration correction optical system 4 (the image vibration correction lens barrel 8) is lowered, can be performed.

Also, since the amplitude of the high frequency signal that is the predetermined signal generated by the high frequency drive signal generating circuit 306 is set to a magnitude by which the subject image that has been formed on the image pickup device 31 is displaced by just a pixel pitch of the image pickup device 31 of the camera 30 to which the lens apparatus 20 is attached at that time, not only will the image quality of the image that is taken by the image pickup device 31 not be degraded but since this corresponds to dulling the image by a pixel pitch, it provides the same effect as an optical low-pass filter. The need to provide the lens apparatus 20 with an optical low-pass filter is thus eliminated and the lens apparatus 20 can be made compact.

On the other hand, if the IS switch 303 is not turned ON and the image vibration correction operation is not performed, the correction drive control circuit 301a applies the high frequency signal (predetermined signal), generated at the high frequency drive signal generating circuit 306, as the drive signal to the coils 36p and 36y. The abovementioned effect equivalent to that of an optical low-pass filter can thus be obtained even when the image vibration correction operation is not performed.

Figure 4:
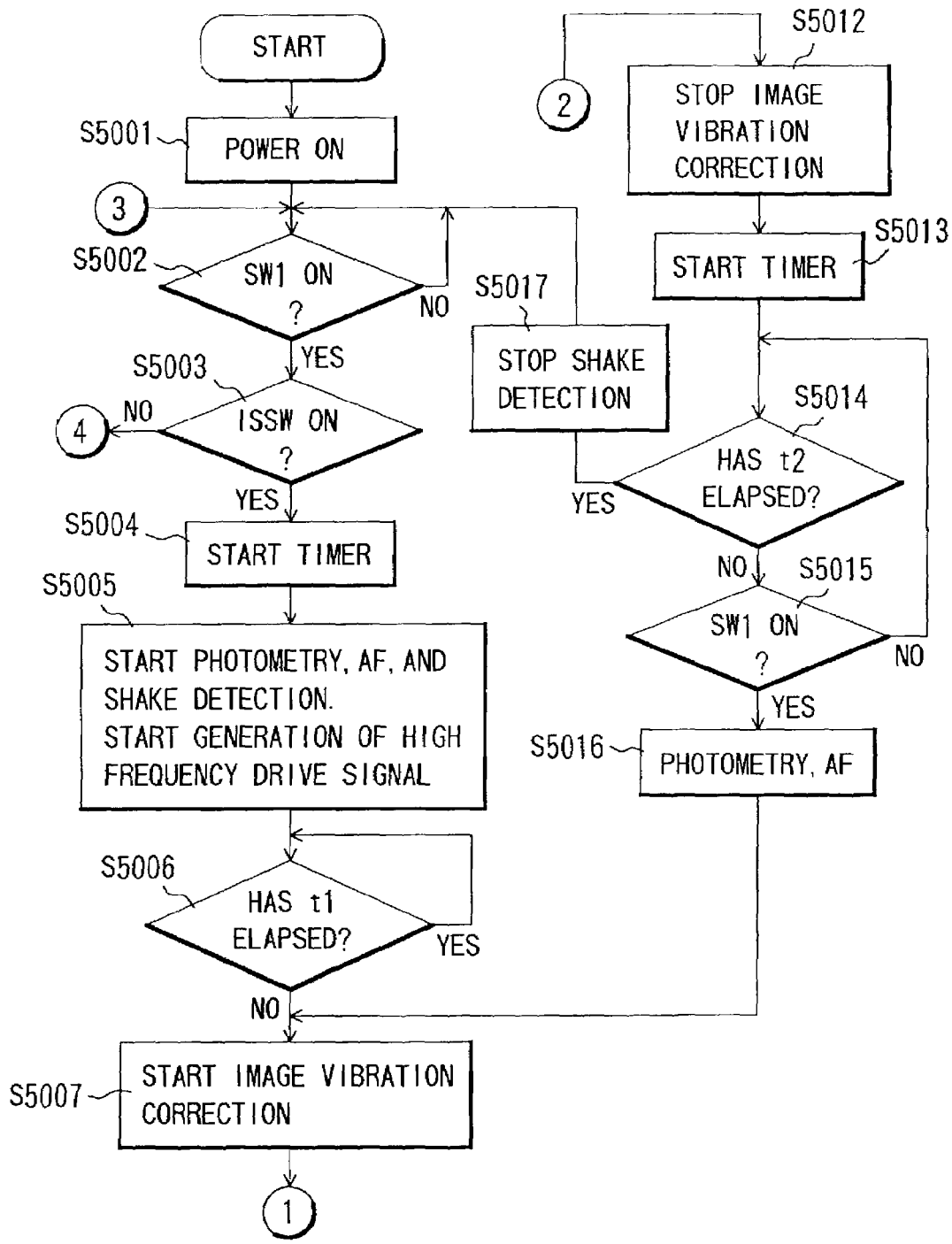
FIG. 4(A) and FIG. 4(B) are flowcharts, showing the operations of the principal parts of the digital camera system of FIG. 1.
Figure 4:
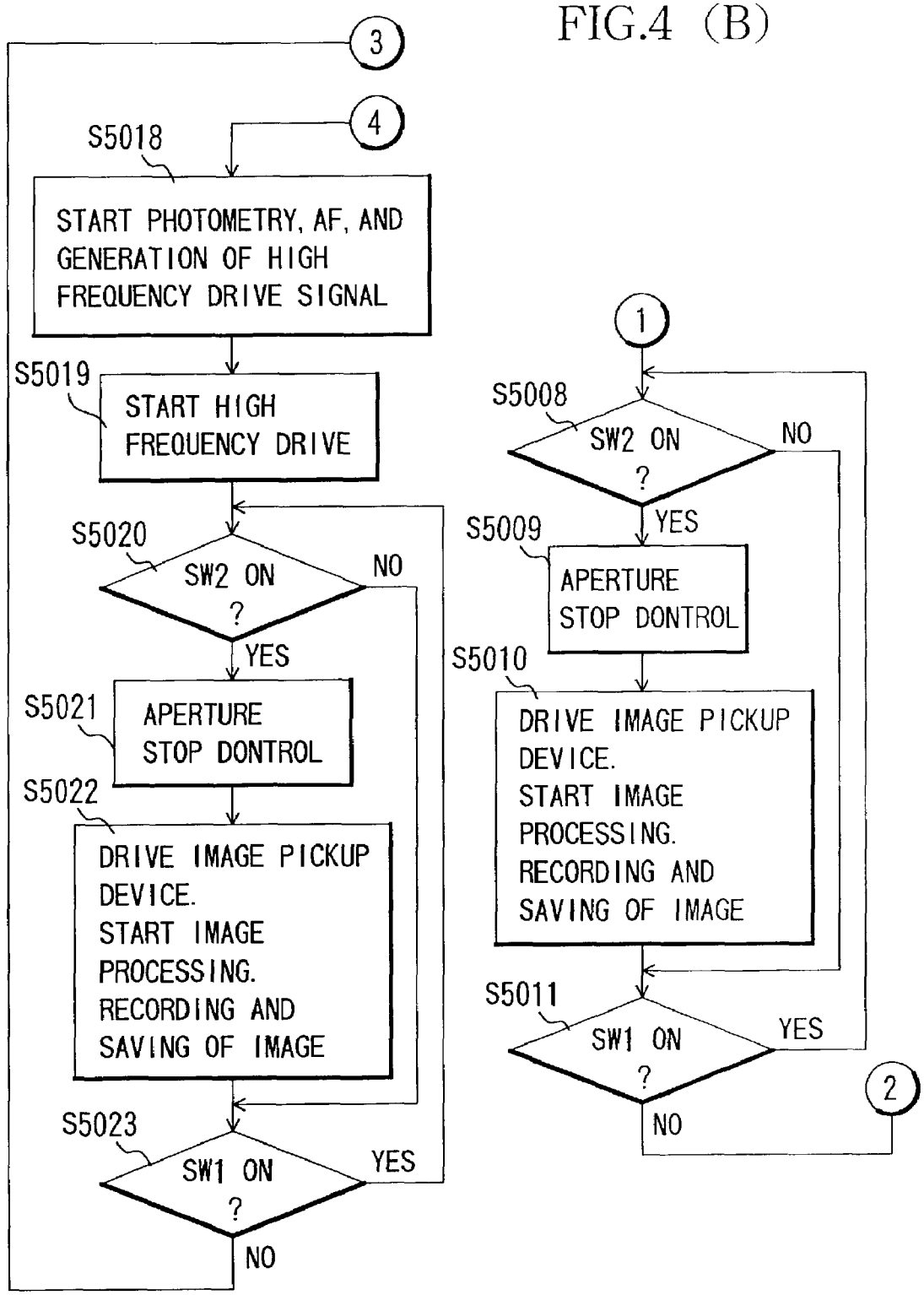

FIG. 4(A) and FIG. 4(B) are flowcharts, showing the operations of the principal parts of the digital camera system of the above-described arrangement. Lines added the circled same numerals in the flowcharts are connected with each other.

First, when the power switch 203 of the camera 30 is turned ON, the supply of power to the lens apparatus 20 is started (step 5001, the word "step" in the specification is abbreviated to "S" in figures.). The same is performed when new batteries are put in and when the lens apparatus 20 is fitted onto the camera 30.

Communication between the camera 30 and the lens apparatus 20 is then started and the pixel pitch information (or pixel number information or pixel size information) of the image pickup device 31 is transmitted from the camera 30 to the lens apparatus 20.

Next, the camera CPU 201 judges whether or not the first stroke switch SW1 is ON (S5002), and if this switch is ON, the lens CPU 301 judges whether or not the IS switch 303 is ON (S5003). If IS switch 303 is ON, a step 5004 is entered and if the switch is not ON, a step 5018 is entered.

Upon entering the step 5004, the lens CPU 301 starts an internal timer. The camera CPU 201 then starts the photometry and AF (range finding) operations and the lens CPU 301 starts the AF (focusing) operation and shake (vibration) detection and also starts the generation of the high frequency signal of the predetermined amplitude based on the pixel pitch information (or pixel number information or pixel size information) of the image pickup device 31 and the focal length information (S5005).

Next, the lens CPU 301 checks whether or not the time measured by the abovementioned timer has reached a predetermined time t1 and if this time is not reached, stays in this step until this time is reached (S5006). This is a process of waiting until the output of the vibration detection circuit 304 stabilizes.

Then after the predetermined time t1 elapses, the high frequency signal generated by the high frequency drive signal generating circuit 306 is added to the vibration detection signals from the vibration detection circuit 304 and the synthesized drive signals are applied to the coils 36p and 36y to start the image vibration correction operation (S5007).

The camera CPU 201 then checks whether or not the second stroke switch SW2 is ON (S5008), and if this switch is not ON, checks the state of the first stroke switch SW1 again (S5011). If the first stroke switch SW1 is also not ON at this stage, the lens CPU 301 stops the image vibration correction operation (S5012).

Also, if in the step 5011, the second stroke switch SW2 is not ON but the first stroke switch SW1 is still ON, the step 5008 is returned to and the state of the second stroke switch SW2 is checked again here.

If it has been judged that the second stroke switch SW2 has turned ON, the lens CPU 301 controls the aperture stop circuit 309 (S5009) and the camera CPU 201 drives the image pickup device 31 to make the photoelectric conversion of the optical image formed on the image pickup device 31 be performed and make the image signal be output.

The image processing circuit 209 is then made to process the obtained image signal and the image recording circuit 210 is made to record and save the processed image in the abovementioned storage medium (S5010).

The camera CPU 201 then checks the state of the first stroke switch SW1 (S5011), and if the first stroke switch SW1 is OFF, sends the signal for stopping the image vibration correction operation to the lens CPU 301.

When the above operations are completed, the lens CPU 301 resets and restarts the abovementioned timer once (S5013) and judges whether or not the turning ON of the first stroke switch SW1 occurs again within a predetermined time t2 (S5014, S5015, S5014 . . . ).

If the first stroke switch SW1 is turned ON again within the predetermined time t2 from the stoppage of the image vibration correction operation, the camera CPU 201 and the lens CPU 301 perform photometry and AF (range finding operation and focusing operation) (S5016). At this time, since the shake detection is continued as it is, the high frequency signal generated by the high frequency drive signal generating circuit 306 is added to the vibration detection signals from the vibration detection circuit 304 and the image vibration correction operation is performed based on the synthesized drive signals. Thereafter, the same operations as those described above are repeated.

By performing such a process, it becomes possible to resolve the problem of having to start up the vibration detection circuit 304 and wait until its output stabilizes each time a photographer interrupts a release operation and thereafter performs a release operation again as described above.

On the other hand, if the first stroke switch SW1 is not turned ON within the predetermined time t2 from the stoppage of the image vibration correction operation (S5014), the lens CPU 301 stops the shake detection by vibration detection circuit 304 (S5017). Thereafter, the step 5002 is returned to and the state of waiting for the turning ON of the first stroke switch SW1 is entered.

If the IS switch 303 is not ON at the step 5003, the camera CPU 201 starts photometry and AF (range finding operation), the lens CPU 301 starts AF (focusing operation) and the generation of the high frequency signal (S5018), and the high frequency signal generated by the high frequency drive signal generating circuit 306 is applied as the drive signal to the coils 36p and 36y (S5019).

Next, the camera CPU 201 checks whether or not the second stroke switch SW2 is ON (S5020) and if the switch is not ON, checks the state of the first stroke switch SW1 again (S5023). If even the first stroke switch SW1 is not ON at this stage, step 5002 is returned to and the state of waiting for the turning ON of the first stroke switch SW1 is entered.

If the second stroke switch SW2 is judged not to be ON in the step 5020 but the first stroke switch SW1 is judged to be ON in the step 5022, the step 5020 is returned to. Then if in the step 5020, the second stroke switch SW2 is judged to be ON, the lens CPU 301 controls the aperture stop circuit 309 and the camera CPU 201 drives the image pickup device 31 to make the photoelectric conversion of the optical image formed on the image pickup device 31 be performed and make the image signal be output. The image processing circuit 209 is then made to process the obtained image signal and the image recording circuit 210 is made to record and save the processed image signal in the abovementioned storage medium (S5022). The camera CPU 201 then checks the state of the first stroke switch SW1 (S5023) and returns to the step S5002 or the step 5020.

The lens-exchangeable digital camera system of this embodiment repeats the above-described series of operations until the power switch 203 of camera 30 is turned OFF. When the switch is turned OFF, communication between the camera CPU 201 and the lens CPU 301 is ended and the supply of power to the lens apparatus 20 is also ended.

Though a lens-exchangeable type digital camera system was described above by way of an embodiment, this invention may also be applied to an integral lens type digital camera. That is, a high frequency signal with an amplitude based on the pixel pitch (or number of pixels or pixel size) of the image pickup device is generated, vibration detection signals and the high frequency signal are synthesized to drive and control an image vibration correction optical system during image vibration correction, and the image vibration control optical system is driven and controlled with just the high frequency signal in the case where the image vibration correction is not performed.

As has been described above, with the present embodiment, since a high frequency signal, with an amplitude of a magnitude based on information about the pixels (pixel pitch information, pixel number information, or pixel size information) of an image pickup device used in a camera, is generated and vibration detection signals and the high frequency signal are synthesized into drive signal to drive and control an image vibration correction optical system when an image vibration correction operation is selected, the friction that arises within the image vibration correction optical unit during the image vibration correction operation can be reduced and the drive characteristics of the image vibration correction optical unit can be improved.

Moreover, since the abovementioned information about the pixels of the image pickup device is acquired by communication from the camera side when a lens apparatus is mounted to a camera, the above effects can be obtained even in the case where a lens apparatus is to be used in combination with a plurality of types of digital cameras that respectively differ in the pixel pitch of the image pickup device, and a lens apparatus can be realized with which the optimal image vibration correction control can be performed constantly even when combined with various digital cameras.

Also, since the setting of the amplitude of the above-described high frequency signal to a magnitude by which a subject image formed on the image pickup surface of the image pickup device is displaced by a pixel pitch of the image pickup device not only does not affect the degradation of the image quality but also corresponds to dulling the image by a pixel pitch, the same effect as an optical low-pass filter can be obtained to improve the image quality.

Meanwhile, since in the case where the image vibration correction operation is not selected, the image vibration correction optical system is driven and controlled based on just the above-described high frequency signal, the same effect as an optical low-pass filter can be obtained even when image vibration correction is not performed. Thus not only can the drive characteristics of the image correction drive be improved and the image vibration correction effect be increased as described above but an optical low-pass filter can be abolished to enable the lens apparatus and, consequently, the camera system to be made compact.

While preferred embodiment has been described, it is to be understood that modification and variation of the present invention may be made without departing from the sprit or scope of the following claims.

What is claimed is:

1. A lens apparatus, which forms an optical image by means of an image taking optical system and is detachably mountable to a camera comprising an image pickup device for photoelectric conversion of the optical image and generating a single image by one photoelectric conversion operation of said image pickup device, said lens apparatus comprising:
    an optical element, included in said image taking optical system and being movable at least in a direction perpendicular to the optical axis;
    a drive unit, which drives said optical element;
    a communication circuit, which communicates information with said camera; and
    a control circuit, which makes said drive unit drive said optical element in the direction perpendicular to the optical axis at an amplitude that is in accordance with information, about the pixels of said image pickup device, acquired from said camera side via said communication circuit,
    wherein said optical element is driven at said amplitude continuously in the period of the one photoelectric conversion operation.

2. The lens apparatus according to claim 1, wherein said information about the pixels is information expressing at least one among the pixel pitch, the number of pixels, and the pixel size of said image pickup device.

3. A lens apparatus, which forms an optical image by means of an image taking optical system and is detachably mountable to a camera comprising an image pickup device for photoelectric conversion of the optical image and generating a single image by one photoelectric conversion operation of said image pickup device, said lens apparatus comprising:
    an image vibration correction optical system, included in said image taking optical system and being movable for correction of image vibration occurred by shaking of said lens apparatus;
    a vibration detection unit, which detects the shaking of said lens apparatus;
    a drive unit, which drives said image vibration correction optical system;
    a communication circuit, which communicates information with said camera; and
    a control circuit, which provides drive signals to said drive unit to make said drive unit drive said image vibration correction optical system;
    wherein said control circuit generates a predetermined signal that differs from vibration detection signals from said vibration detection unit, determines the amplitude of said predetermined signal based on information about the pixels of said image pickup device acquired from said camera side via said communication circuit, and provides to said drive unit said drive signals, obtained by synthesizing said predetermined signal and said vibration detection signals, to make said drive unit drive said image vibration correction optical system,
    wherein said image vibration correction optical system is driven so that its motion includes a continuous motion according to the amplitude of said predetermined signal in the period of the one photoelectric conversion operation.

4. The lens apparatus according to claim 3, wherein said information about the pixels is information expressing at least one among the pixel pitch, the number of pixels, and the pixel size of said image pickup device.

5. The lens apparatus according to claim 3, wherein the amplitude of said predetermined signal is of a magnitude by which the optical image on the image pickup surface of said image pickup device is displaced by an amount corresponding to a pixel pitch of said image pickup device.

6. A lens apparatus, which forms an optical image by means of an image taking optical system and is detachably mountable to a camera comprising an image pickup device for photoelectric conversion of the optical image and generating a single image by one photoelectric conversion operation of said image pickup device, said lens apparatus comprising:
    an image vibration correction optical system, included in said image taking optical system and being movable for correction of image vibration occurred by shaking of said lens apparatus;
    a vibration detection unit, which detects the shaking of said lens apparatus;
    a drive unit, which drives said image vibration correction optical system;
    a communication circuit, which communicates information with said camera; and
    a control circuit, which provides drive signals to said drive unit to make said drive unit drive said image vibration correction optical system,
    wherein said control circuit generates a predetermined signal that differs from vibration detection signals from said vibration detection unit, determines the amplitude of said predetermined signal based on information, about the pixels of said image pickup device, acquired from said camera side via said communication circuit, and provides said predetermined signal as the drive signal to said drive unit to make said drive unit drive said image vibration correction optical system so that its motion becomes a continuous motion according to the amplitude of said predetermined signal in the period of the one photoelectric conversion operation when image vibration correction is not performed.

7. The lens apparatus according to claim 6, wherein said information about the pixels is information expressing at least one among the pixel pitch, the number of pixels, and the pixel size of said image pickup device.

8. The lens apparatus according to claim 6, wherein the amplitude of said predetermined signal is of a magnitude by which the optical image on the image pickup surface of said image pickup device is displaced by an amount corresponding to a pixel pitch of said image pickup device.

9. A lens apparatus, which forms an optical image by means of an image taking optical system, comprising:
- an image vibration correction optical system, included in said image taking optical system and being movable for correction of image vibration occurred by shaking of said lens apparatus;
- a drive unit, which drives said image vibration correction optical system; and
- a control circuit, which makes said driving unit drive said image vibration correction optical system,
- wherein said lens apparatus is detachably mountable to a camera, which includes an image pickup device for photoelectric conversion of the optical image and generates a single image by one photoelectric conversion operation of said image pickup device, and
- said control circuit makes said drive unit drive said image vibration correction optical system continuously in the period of the one photoelectric conversion operation so as to cut high frequency components of the optical image even when image vibration correction is not performed.

10. The lens apparatus according to claim 9, further comprising: a communication circuit, which communicates information with said camera,
- wherein said control circuit makes said drive unit drive said image vibration correction optical system at an amplitude determined based on information, about the pixels of said image pickup device, acquired from said camera side via said communication circuit.

11. The lens apparatus according to claim 10, wherein said information about the pixels is information expressing at least one among the pixel pitch, the number of pixels, and the pixel size of said image pickup device.

12. The lens apparatus according to claim 10, wherein the amplitude of said predetermined signal is of a magnitude by which the optical image on the image pickup surface of said image pickup device is displaced by an amount corresponding to a pixel pitch of said image pickup device.

13. A camera system comprising:
- a camera, which is provided with an image pickup device for photoelectric conversion of an optical image and generates a single image by one photoelectric conversion operation of said image pickup device; and
- a lens apparatus, which is detachably mountable to the camera and provided with an optical element, included in an image taking optical system for forming the optical image and being movable at least in a direction perpendicular to the optical axis, a drive unit, which drives said optical element, and a communication circuit, which communicates information with said camera,
- said camera system further comprising:
- a camera side storage circuit, which is disposed in said camera and stores information about the pixels of said image pickup device; and
- a lens side control circuit, which is disposed in said lens apparatus, acquires, via said communication circuit, said information about the pixels of the image pickup device stored in said camera side storage circuit, and makes said drive unit drive said optical element in the direction perpendicular to the optical axis at an amplitude that is in accordance with said information,
- wherein said optical element is driven at said amplitude continuously in the period of the one photoelectric conversion operation.

14. The camera system according to claim 13, wherein said information about the pixels is information expressing at least one among the pixel pitch, the number of pixels, and the pixel size of said image pickup device.

15. The camera system according to claim 13, wherein the amplitude of said predetermined signal is of a magnitude by which the optical image on the image pickup surface of said image pickup device is displaced by an amount corresponding to a pixel pitch of said image pickup device.

16. A camera system comprising: a camera, which is provided with an image pickup device for photoelectric conversion of an optical image and generates a single image by one photoelectric conversion operation of said image pickup device; and a lens apparatus, which is detachably mountable to the camera and provided with an image vibration correction optical system, included in an image taking optical system for forming the optical image and being movable for correction of image vibration occurred by shaking of said lens apparatus, a vibration detection unit, which detects the shaking of said lens apparatus, and a drive unit, which drives said image vibration correction optical system; said camera system further comprising:
- communication circuits, which are disposed respectively in said camera and said lens apparatus and communicate information between said camera and said lens apparatus;
- a camera side storage circuit, which is disposed in said camera and stores information about the pixels of said image pickup device; and
- a lens side control circuit, which is disposed in said lens apparatus, generates a predetermined signal that differs from vibration detection signals from said vibration detection unit, acquires, via said communication circuits, said information about the pixels of the image pickup device stored in said camera side storage circuit, determines the amplitude of said predetermined signal based on said information, and provides to said drive unit drive signals, obtained by synthesizing said predetermined signal and said vibration detection signals, to make said drive unit drive said image vibration correction optical system,
- wherein said image vibration correction optical system is driven so that its motion includes a continuous motion according to the amplitude of said predetermined signal in the period of the one photoelectric conversion operation.

17. The camera system according to claim 16, wherein said information about the pixels is information expressing at least one among the pixel pitch, the number of pixels, and the pixel size of said image pickup apparatus.

18. The camera system according to claim 17, wherein the amplitude of said predetermined signal is of a magnitude by which the optical image on the image pickup surface of said image pickup device is displaced by an amount corresponding to a pixel pitch of said image pickup device.

19. A camera system comprising:
- a camera, which is provided with an image pickup device for photoelectric conversion of an optical image and generates a single image by one photoelectric conversion operation of said image pickup device; and
- a lens apparatus, which is detachably mountable to the camera and provided with an image vibration correction optical system, included in an image taking optical system for forming an optical image and being movable for correction of image vibration occurred by shaking of said lens apparatus, a vibration detection unit, which detects the shaking of said lens apparatus, and a drive unit, which drives said image vibration correction optical system, said camera system further comprising:
- communication circuits, which are disposed respectively in said camera and said lens apparatus and communicate information between said camera and said lens apparatus;
- a camera side storage circuit, which is disposed in said camera and stores information about the pixels of said image pickup device; and
- a lens side control circuit, which is disposed in said lens apparatus, generates a predetermined signal that differs from vibration detection signals from said vibration detection unit, acquires, via said communication circuits, said information about the pixels of the image pickup device stored in said camera side storage circuit, determines the amplitude of said predetermined signal based on said information, and provides said predetermined signal as the drive signal to said drive unit to make said drive unit drive said image vibration correction optical system so that its motion becomes a continuous motion according to the amplitude of said predetermined signal in the period of the one photoelectric conversion operation when image vibration correction is not performed.

20. The camera system according to claim 19, wherein said information about the pixels is information expressing at least one among the pixel pitch, the number of pixels, and the pixel size of said image pickup device.

21. The camera system according to claim 19, wherein the amplitude of said predetermined signal is of a magnitude by which the optical image on the image pickup surface of said image pickup device is displaced by an amount corresponding to a pixel pitch of said image pickup device.

22. A camera system comprising:
- a camera unit, which takes an optical image and generates a single image by one photoelectric conversion operation of an image pickup device; and
- a lens unit, which forms the optical image by means of an image taking optical system and is provided with an image vibration correction optical system, included in said image taking optical system and being movable for correction of image vibration occurred by shaking of said lens unit, and a drive unit, which drives said image vibration correction optical system, said camera system further comprising: a control circuit, which makes said drive unit drive said image vibration correction optical system continuously in the period of the one photoelectric conversion operation so as to cut high frequency components of the optical image even when image vibration correction is not performed.

23. The camera system according to claim 22, wherein said lens unit is detachably mountable to said camera unit, said lens unit and said camera unit are respectively provided with communication circuits that communicate information between said lens unit and camera unit, wherein said camera unit is provided with said image pickup device, for photoelectric conversion of the optical image, and a camera side storage circuit, which stores information about the pixels of said image pickup device; and said lens unit is detachably mountable to said camera unit and provided with a lens side control circuit, which makes said drive unit drive said image vibration correction optical system at an amplitude determined based on information, about the pixels of said image pickup device, acquired from said camera side storage circuit via said communication circuits.

24. The camera system according to claim 23, wherein said information about the pixels is information expressing at least one among the pixel pitch, the number of pixels, and the pixel size of said image pickup device.

25. The camera system according to claim 23, wherein the amplitude of said predetermined signal is of a magnitude by which the optical image on the image pickup surface of said image pickup device is displaced by an amount corresponding to a pixel pitch of said image pickup device.

26. A camera, which includes an image pickup device for photoelectric conversion of an optical image, generates a single image by one photoelectric conversion operation of said image pickup device, and to which a lens apparatus is detachably mountable, said lens apparatus comprising an optical element, included in an image taking optical system for forming the optical image and being movable at least in a direction perpendicular to the optical axis, a drive unit that drives said optical element, and a control circuit that makes said drive unit drive said optical element in the direction perpendicular to the optical axis at an amplitude that is in accordance with information, about the pixels of said image pickup device, acquired from the camera side, said optical element being driven at the amplitude continuously in the period of the one photoelectric conversion operation, said camera comprising:
- a communication circuit, which communicates information with said lens apparatus; and
- a storage circuit, which stores information about the pixels of said image pickup device,
- wherein said communication circuit sends to said camera information, about the pixels of said image pickup device, stored in said storage circuit.

27. The camera according to claim 26, wherein said information about the pixels is information expressing at least one among the pixel pitch, the number of pixels, and the pixel size of said image pickup device.

28. A camera, which includes an image pickup device for photoelectric conversion of an optical image, generates a single image by one photoelectric c conversion operation of said image pickup device, and to which a lens detachably mountable, said lens apparatus forming the optical image by means of an image taking optical system and being provided with an image vibration correction optical system, included in said image taking optical system and being movable for correction of image vibration occurred by shaking of said lens apparatus, a vibration detection unit that detects the shaking of said lens apparatus, a drive unit that drives said image vibration correction optical system, and a control circuit that generates a predetermined signal that differs from vibration detection signals from said vibration detection unit, determines the amplitude of said predetermined signal based on information, about the pixels of said image pickup device, acquired from said camera side, and provides to said drive unit drive signals, obtained by synthesizing said predetermined signal and said vibration detection signals, to make said drive unit drive said image vibration correction optical system so that its motion includes a continuous motion according to the amplitude of said predetermined signal in the period of the one photoelectric conversion operation, said camera comprising:
- a communication circuit, which communicates information with said lens apparatus; and
- a storage circuit, which stores information about the pixels of said image pickup device, wherein said information, about the pixels of said image pickup device and stored in said storage circuit, is sent to said camera via said communication circuit.

29. The camera according to claim 28, wherein said information about the pixels is information expressing at least one among the pixel pitch, the number of pixels, and the pixel size of said image pickup device.

30. A camera, which includes an image pickup device for photoelectric conversion of an optical image, generates a single image by one photoelectric conversion operation of said image pickup device, and to which a lens apparatus is detachably mountable, said lens apparatus forming the optical image by means of an image taking optical system and being provided with an image vibration correction optical system, included in said image taking optical system and being movable for correction of image vibration occurred by shaking of said lens apparatus, a vibration detection unit that detects the shaking of said lens apparatus, a drive unit that drives said image vibration correction optical system, and a control circuit that generates a predetermined signal that differs from vibration detection signals from said vibration detection unit, determines the amplitude of said predetermined signal based on information, about the pixels of said image pickup device, acquired from said camera side, and provides said predetermined signal as the drive signal to said drive unit to make said drive unit drive said image vibration correction optical system so that its motion becomes a continuous motion according to the amplitude of said predetermined signal in the period of the one photoelectric conversion operation when image vibration correction is not performed, said camera comprising:
  a communication circuit, which communicates information with said lens apparatus; and
  a storage circuit, which stores information about the pixels of said image pickup device,
  wherein said information, about the pixels of said image pickup device and stored in said storage circuit, is sent to said camera via said communication circuit.

31. The camera according to claim 30, wherein said information about the pixels is information expressing at least one among the pixel pitch, the number of pixels, and the pixel size of said image pickup device.

32. A camera, which includes an image pickup device for photoelectric conversion of an optical image, generates a single image by one photoelectric conversion operation of said image pickup device, and to which a lens apparatus is detachably mountable, said lens apparatus forming the optical image by means of an image taking optical system and is provided with an image vibration correction optical system, included in said image taking optical system and being movable for correction of image vibration occurred by shaking of said lens apparatus, a drive unit that drives said image vibration correction optical system, and a control circuit that makes said drive unit drive said image vibration correction optical system continuously in the period of the one photoelectric conversion operation at an amplitude, determined based on information about the pixels of said image pickup device acquired from the camera side, to cut high frequency components of the optical image even when image vibration correction is not performed, said camera comprising:
  a communication circuit, which communicates information with said lens apparatus; and
  a storage circuit, storing information about the pixels of said image pickup device,
  wherein said information, about the pixels of said image pickup device and stored in said storage circuit, is sent to said camera via said communication circuit.

33. The camera according to claim 32, wherein said information about the pixels is information expressing at least one among the pixel pitch, the number of pixels, and the pixel size of said image pickup device.

* * * * *